United States Patent
Das et al.

(10) Patent No.: US 12,554,566 B1
(45) Date of Patent: Feb. 17, 2026

(54) MACHINE LEARNING MODEL RESOURCE UTILIZATION OPTIMIZATION

(71) Applicant: INTUIT INC., Mountain View, CA (US)

(72) Inventors: Sidharth Das, Bangalore (IN); Kalapriya Kannan, Bengaluru (IN); Rupal Kothari, Bangalore (IN); Amruthavarshini R, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/246,918

(22) Filed: Jun. 24, 2025

(51) Int. Cl.
 *G06F 11/00* (2006.01)
 *G06F 11/07* (2006.01)
 *G06F 11/30* (2006.01)
 *G06N 20/00* (2019.01)

(52) U.S. Cl.
 CPC ...... *G06F 11/0754* (2013.01); *G06F 11/3082* (2013.01); *G06N 20/00* (2019.01)

(58) Field of Classification Search
 CPC ............. G06F 11/0754; G06F 11/3082; G05F 11/079; G06N 20/00
 See application file for complete search history.

(56) References Cited

U.S. PATENT DOCUMENTS

| | | | | |
|---|---|---|---|---|
| 11,379,340 | B2 * | 7/2022 | Ikeda | G06F 11/0754 |
| 11,720,464 | B1 * | 8/2023 | Ezrielev | G06N 20/00 |
| | | | | 714/47.1 |
| 12,099,426 | B2 * | 9/2024 | Griffin | G06F 11/3051 |
| 2018/0373579 | A1 * | 12/2018 | Rathore | H03M 13/01 |
| 2019/0370610 | A1 * | 12/2019 | Batoukov | G06F 11/0709 |
| 2020/0073778 | A1 * | 3/2020 | Ikeda | G06F 11/3452 |
| 2020/0311599 | A1 * | 10/2020 | Chen | G06F 18/214 |
| 2020/0363972 | A1 * | 11/2020 | Krasner | G06F 3/0641 |
| 2021/0306201 | A1 * | 9/2021 | Wang | H04L 41/064 |
| 2022/0012608 | A1 * | 1/2022 | Lehmann | G06F 11/3495 |
| 2022/0027257 | A1 * | 1/2022 | Harutyunyan | G06F 11/3409 |
| 2022/0308976 | A1 * | 9/2022 | Nagarajegowda | G06F 11/3414 |
| 2022/0318115 | A1 * | 10/2022 | Cozma | G06F 11/3447 |
| 2022/0413481 | A1 * | 12/2022 | Gawlick | G06F 18/15 |

(Continued)

OTHER PUBLICATIONS

Janeiro et al., "Are Visual Recognition Models Robust to Image Compression?", arXiv:2304.04518v1 [cs.CV] Apr. 10, 2023.

(Continued)

*Primary Examiner* — Jonathan D Gibson
(74) *Attorney, Agent, or Firm* — Patterson + Sheridan, LLP (57) ABSTRACT

Techniques described herein involve optimizing resource utilization in machine learning models. Embodiments include receiving a plurality of data sets and altering the plurality of data sets to produce an altered plurality of data sets, comprising: calculating similarity scores between data sets in the plurality of data sets; if a particular similarity score exceeds a threshold value, removing, from the plurality of data sets, a corresponding data set associated with the particular similarity score; determining anomalous data in a given data set of the plurality of data sets based on an anomaly detection technique; removing data not matching the anomalous data from the given data set; and reducing a size of one or more data sets in the plurality of data sets based on a type of data in each data set. Embodiments further include performing an action using a machine learning model based on the altered plurality of data sets.

17 Claims, 5 Drawing Sheets

(56) References Cited

U.S. PATENT DOCUMENTS

| | | | | |
|---|---|---|---|---|
| 2023/0128199 | A1* | 4/2023 | Griffin | G06F 11/3075 |
| | | | | 709/224 |
| 2024/0046156 | A1* | 2/2024 | Adjaoute | G06N 20/00 |
| 2024/0134834 | A1* | 4/2024 | Baviskar | G06N 20/20 |
| 2024/0144712 | A1* | 5/2024 | Kumar | G06V 30/19093 |
| 2025/0077331 | A1* | 3/2025 | Prasad | G06F 11/0709 |
| 2025/0165173 | A1* | 5/2025 | Chernyak | G06F 11/14 |
| 2025/0225011 | A1* | 7/2025 | Jacob | G06N 20/00 |
| 2025/0259115 | A1* | 8/2025 | Jeyashekar | G06N 20/20 |

OTHER PUBLICATIONS

Shao et al., "Learning to Sample: an Active Learning Framework", arXiv:1909.03585v1 [cs.LG] Sep. 9, 2019.

* cited by examiner

MACHINE LEARNING MODEL RESOURCE UTILIZATION OPTIMIZATION

INTRODUCTION

Aspects of the present disclosure relate to techniques for optimizing resource utilization in machine learning models. In particular, techniques described herein involve receiving a plurality of data sets, producing an altered plurality of data sets by removing and/or reducing the size of certain data in the plurality of data sets, and performing an action using a machine learning model based on the altered plurality of data sets.

BACKGROUND

Every year, millions of people, businesses, and organizations around the world use software applications to assist with countless aspects of life. Because of this, the amount of information provided to and processed by the software applications has greatly increased. Significant amounts of data may be processed when, for example, a software application receives an input from a user and generates a corresponding response. Additionally, models, such as machine learning models, may be used to generate the response and are trained using large data sets. These large data sets may contain millions, or even billions, of data points and much of the data sets may contain duplicate data, irrelevant data, and/or the like. Existing techniques, for both model training and response generation, fail to address the breadth and homogeneity of the data sets. As a result, the entirety of the data may be processed each time training is done or each time a response is generated, which leads to enormous amounts of energy consumption, much of which is wasted, with no benefit to the accuracy of the models and/or responses.

Thus, there is a need in the art for improved techniques for computing resource management in software applications.

BRIEF SUMMARY

Certain embodiments provide a method for optimizing resource utilization in machine learning models. The method generally includes: receiving a plurality of data sets; altering the plurality of data sets to produce an altered plurality of data sets, wherein the altering the plurality of data sets comprises: calculating similarity scores between data sets in the plurality of data sets; if a particular similarity score of the similarity scores exceeds a threshold value, removing, from the plurality of data sets, a corresponding data set associated with the particular similarity score; determining anomalous data in a given data set of the plurality of data sets based on an anomaly detection technique; removing data not matching the anomalous data from the given data set in the plurality of data sets; and reducing a size of one or more data sets in the plurality of data sets based on a type of data in each data set of the one or more data sets; and performing an action using a machine learning model based on the altered plurality of data sets.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for optimizing resource utilization in machine learning models.

Response generation using machine learning models, along with training the machine learning models, consume vast amounts of energy and computing resources, leading to high costs and inefficient processing. Current techniques utilize large data sets that often contain duplicate and/or irrelevant data, which contribute heavily to the high costs. To improve response generation and model training, techniques described herein employ a series of steps to reduce the size of data sets by automatically identifying and discarding substantially duplicative data sets, removing irrelevant data from the data sets, and/or by compressing data within the data sets. Such techniques result in altered data sets that provide a more efficient process for response generation and model training that uses significantly less resources while maintaining accuracy.

For example, a plurality of data sets may be received by the system. The plurality of data sets may then be altered to produce an altered plurality of data sets. First, similarity scores may be calculated between data sets of the plurality of data sets. In other words, each data set is compared to each of the other data sets in the plurality of data sets. If any two data sets are too similar (i.e., their similarity score exceeds a threshold value), one of the data sets is removed from the plurality of data sets. In this way, data sets that contain the same information are not processed twice, which would use more energy while providing no improvement to system accuracy. The similarity score may be calculated using a similarity metric, such as cosine similarity, Euclidean distance, or a Jaccard index. The particular similarity metric may be chosen based on the type of data in the data sets (e.g., cosine similarity may be used for text data while a Jaccard index may be used for binary data). The threshold value may be determined based on one or more features in the data sets and weights assigned to the one or more features in the machine learning model. For example, variations in features assigned high weights inside the machine learning model will result in significant disparities in outputs from the machine learning model while variations in features assigned low weights will have little to no impact on the outputs.

Next, anomalous data may be identified in one or more of the data sets in the plurality of data sets, such as by using an anomaly detection technique. In some cases, the anomaly detection technique may include using an anomaly detection model trained to analyze attributes and identify patterns within sets of data. The anomalous data (i.e., data that is unique relative to other data in a data set and/or relative to data in other data sets) is retained in its respective data set while the remaining data may be removed (e.g., data that is repetitive and/or indistinctive is removed while leaving the impactful data). The system again saves computing resources by processing less data, but still processes the most relevant data, retaining overall accuracy.

Lastly, the size of one or more of the data sets in the plurality of data sets may be reduced based on the type of data in the particular data set. For example, visual media data, such as a video file, may be compressed. Once the altered plurality of data sets is created, an action may be performed using a machine learning model. For example, a machine learning model may be trained based on the altered plurality of data sets and/or an output may be generated using the machine learning model based on the altered plurality of data sets. In some cases, the output may then be displayed via a user interface and/or sent to one or more elements of a software application. Additionally, the altered plurality of data sets may be stored for future processing and/or continuously updated (e.g., by performing one or more of the aforementioned steps) as new data sets are received.

Embodiments of the present disclosure provide numerous technical and practical effects and benefits. Current techniques for response generation and machine learning model training rely on very large data sets with duplicate and/or irrelevant data, which causes high energy consumption and wasted computing resources. The present disclosure solves this technical problem. Techniques described herein ensure more efficient, less costly processing while maintaining model and output accuracy. By altering a plurality of data sets prior to processing (e.g., by a machine learning model), only the most relevant, non-redundant data is passed through the system, significantly reducing the amount of energy and computing resources that would otherwise be expended to process the full amount of data (e.g., which would include data that provides no benefit to training or output generation). This multi-faceted approach ensures that the plurality of data sets is optimized across data sets, within each data set, and for various types of data. For example, duplicate and/or substantially similar data sets are first discarded. Then, repetitive or irrelevant data within each data set is removed, leaving only unique, useful data for processing. Lastly, remaining data in the data sets may be reduced in size, such as by compressing certain types of data (e.g., images, videos, etc.). The result is an altered plurality of data sets that is much smaller, thereby saving energy and computing resources during processing, but that still contains the necessary data to generate outputs with at least the same level of accuracy as the original plurality of data sets. Experimental results have demonstrated that a collection of 300 million data points requires over 48 billion CPU cycles to process, which would consume 48 gigawatts of power. Given a direct correlation between data size and power consumption, reducing the size of the data by approximately 50% using techniques described herein reduces the power consumption by approximately 24 gigawatts, while maintaining a high level of model performance.

Figure 1:
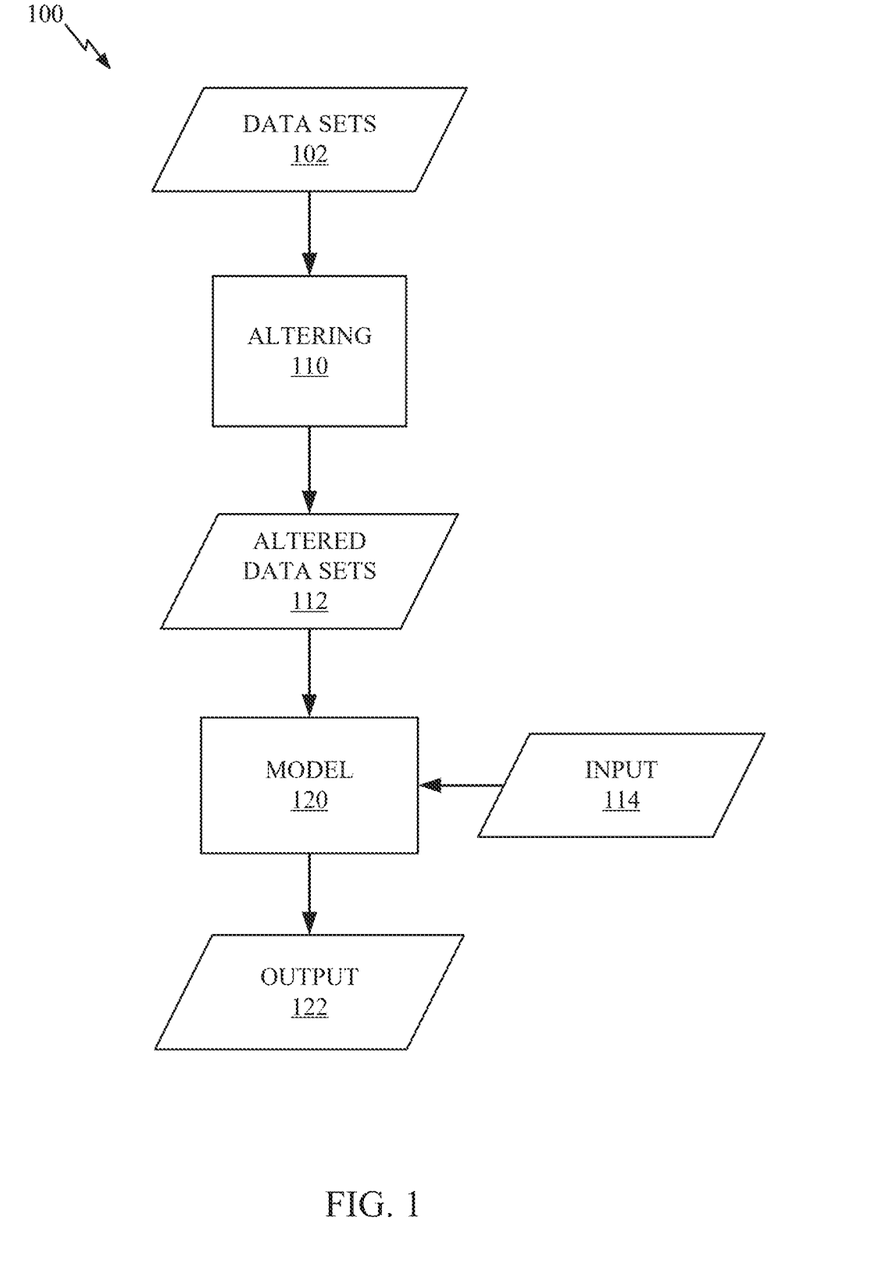
FIG. 1 depicts an example workflow related to optimizing resource utilization in machine learning models.

Example Workflows Related to Optimizing Resource Utilization in Machine Learning Models FIG. 1 depicts an example workflow 100 related to optimizing resource utilization in machine learning models. For example, workflow 100 may represent a series of steps associated with altering sets of data for use in generating responses to input queries using machine learning models.

A plurality of data sets 102 may be received by a system. The plurality of data sets 102 may then be altered, during altering 110, to produce a plurality of altered data sets 112. Altering 110 may comprise one or more of discarding duplicate and/or substantially similar data sets from the plurality of data sets 102, removing redundant and/or irrelevant data from one or more data sets in the plurality of data sets 102, and/or reducing the size of certain data in one or more data sets in the plurality of data sets 102, as described in more detail below with respect to FIG. 3.

The altered data sets 112, along with an input 114 may then be passed to a model 120. The input 114, for example, may comprise a natural language query provided by a user, such as via a user interface. The model 120 may comprise a machine learning model. In a particular example, model 120 is a language processing machine learning model such as a large language model (LLM). For example, model 120 may have been trained on a large training data set in order to process natural language inputs and generate natural language content in response. In some embodiments, model 120 is a generative pre-trained transformer (GPT) model that has been trained on a large set of training data (e.g., across a plurality of domains), and is capable as a result of such training to perform a wide variety of language-related tasks in response to natural language prompts. In some embodiments, model 120 has been fine-tuned for one or more particular domains, such as for use with a particular software application or for a specific purpose, while in other embodiments model 120 has been trained in a more general fashion and has not been fine-tuned in such a manner. Model 120 may have a large number of tunable parameters, which are iteratively adjusted during a model training process based on training data. In alternative embodiments, model 120 may be another type of machine learning model that is capable of generating content. For example, model 120 may be a generative adversarial network (GAN), an autoencoder model, an autoregressive model, a diffusion model, a Bayesian network, a hidden Markov model, and/or the like.

The model 120 may generate, based on the altered data sets 112 and the input 114, an output 122. For example, the output 122 may be a natural language response addressing one or more aspects of the input 114. In some embodiments, the output 122 may be displayed via a user interface and/or sent to one or more elements of a software application.

Figure 2:
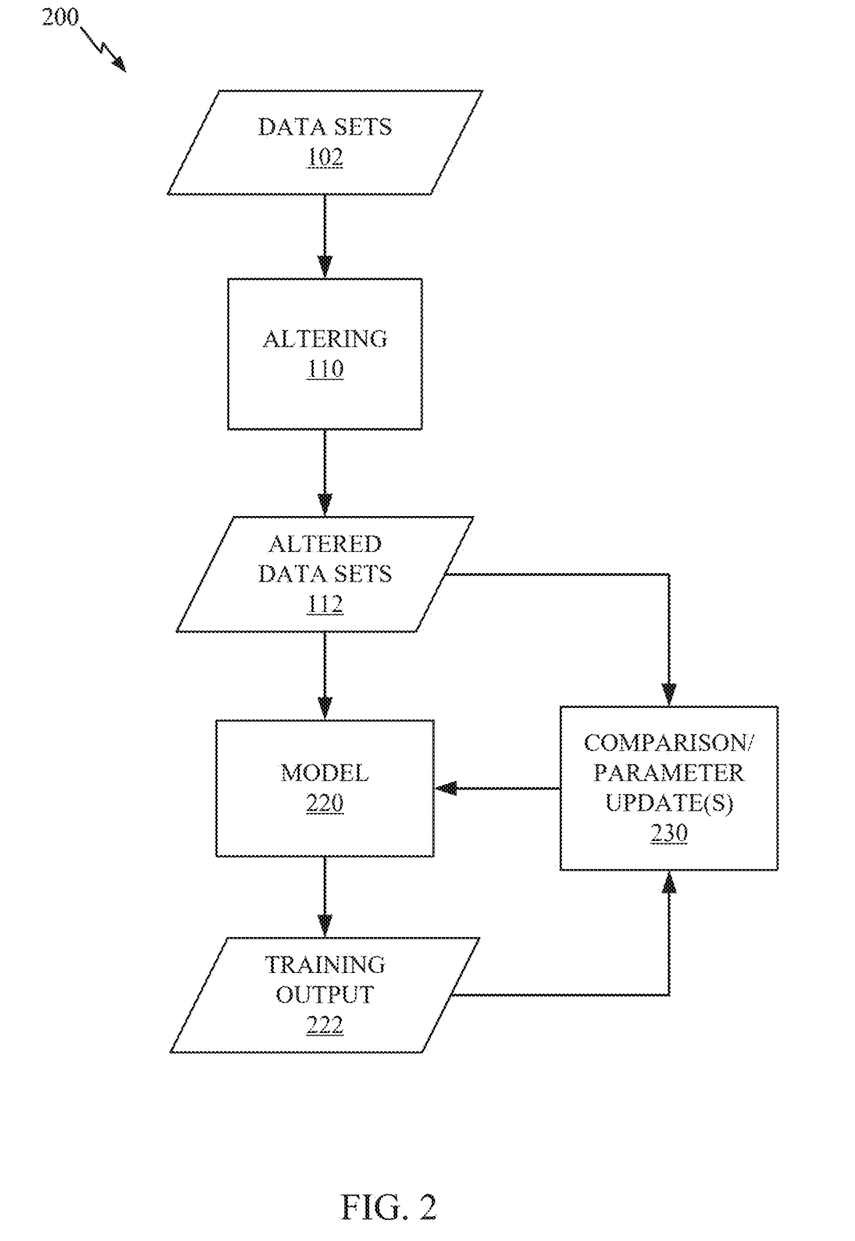
FIG. 2 depicts an additional example workflow related to optimizing resource utilization in machine learning models.

FIG. 2 depicts an additional example workflow 200 related to optimizing resource utilization in machine learning models. In particular, FIG. 2 depicts a series of steps associated with altering sets of data for use in training machine learning models.

A plurality of data sets 102 may be received by a system. The plurality of data sets 102 may then be altered, during altering 110, to produce a plurality of altered data sets 112. Altering 110 may comprise one or more of discarding duplicate and/or substantially similar data sets from the plurality of data sets 102, removing redundant and/or irrelevant data from one or more data sets in the plurality of data sets 102, and/or reducing the size of certain data in one or more data sets in the plurality of data sets 102, as described in more detail below with respect to FIG. 3.

The altered data sets 112 may then be passed to a component associated with training a model 220. The model 220 may be a machine learning model, such as a language processing machine learning model (e.g., a large language model (LLM)) capable of processing natural language inputs and generating natural language content in response, a generative pre-trained transformer (GPT) model capable of performing a wide variety of language-related tasks in response to natural language prompts, and/or other models capable of generating content (e.g., a generative adversarial network (GAN), an autoencoder model, an autoregressive model, a diffusion model, a Bayesian network, a hidden Markov model, and/or the like), among others. In some embodiments, the model 220 may correspond to model 120 of FIG. 1.

The model 220 may then be trained using the altered data sets 112. The training may involve a supervised learning process by which training inputs from the altered data sets 112 are provided to the model 220, the training output 222 generated by the model 220 is compared to labels associated with the training inputs in altered data sets 112, and parameters of the model 220 are iteratively adjusted based on the comparing, such as during comparison/model parameter updates 230, until one or more conditions are met (e.g., until the training output 222 matches the labels, and/or the like). In other embodiments, the training may comprise using direct preference optimization to fine-tune the model 220, such as based on user feedback. Once trained, the model 220 may receive inputs and generate outputs, such as by one or more steps depicted with respect to FIG. 1.

Figure 3:
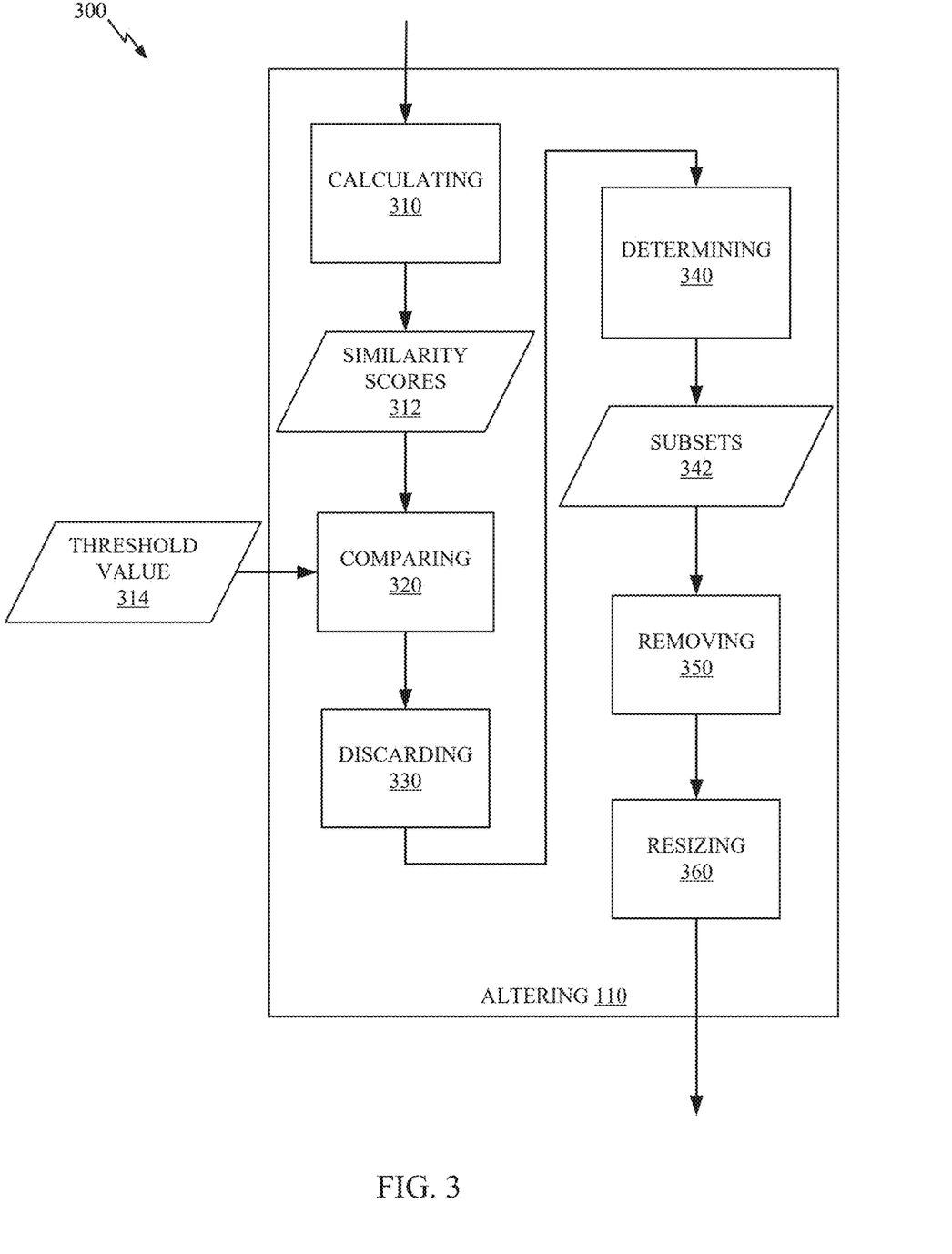
FIG. 3 depicts an additional example workflow related to optimizing resource utilization in machine learning models.

FIG. 3 depicts an additional example workflow 300 related to optimizing resource utilization in machine learning models. In particular, FIG. 3 depicts a series of steps wherein data sets are altered according to certain features before being provided to a machine learning model for processing, such as depicted in FIG. 1 and FIG. 2.

During altering 110, a plurality of data sets, such as data sets 102 of FIG. 1 and FIG. 2, may be altered to produce an altered plurality of data sets (e.g., altered data sets 112 of FIG. 1 and FIG. 2). First, during calculating 310, similarity scores 312 may be calculated between data sets in the plurality of data sets 102. For example, calculating 310 may comprise comparing each data set to each of the other data sets in the plurality of data sets and assigning a similarity score to each combination of data sets. The similarity scores 312 may be calculated using a similarity metric, such as cosine similarity, Euclidean distance, or a Jaccard index. The particular similarity metric may be chosen based on the type of data in the data sets. For example, cosine similarity focuses on an angle between vectors so it is useful for comparing documents or text data (i.e., where the number of common words is less important than the overall direction of the text), while Euclidean distance measures the magnitude of differences between points in a multidimensional space, making it suitable for applications where the distance between points is a key factor (e.g., continuous data), and where a Jaccard index may be suitable for binary data, focusing on the overlap between sets.

Each similarity score of similarity scores 312 may then be compared, during comparing 320, to a threshold value 314. The threshold value 314 may be determined based on one or more features in the data sets and weights assigned to the one or more features in the machine learning model. For example, variations in features assigned high weights inside the machine learning model will result in significant disparities in outputs from the machine learning model while variations in features assigned low weights will have little to no impact on the outputs. Based on these features and weights and/or on comparing outputs produced by data sets of varying similarity, a threshold value 314 may be defined (e.g., 75% similarity) that results in accurate, consistent outputs, while allowing for more data sets to be discarded (e.g., data sets that are similar, not just ones that are exact copies), saving the optimal amount of resources. If any similarity score of similarity scores 312 is greater than the threshold value 314, then the corresponding data sets are considered to be substantially similar, or duplicates, and one of the corresponding data sets is removed from the plurality of data sets 102 during discarding 330. As a result, data sets that contain largely the same information are not processed multiple times, which would cause high energy consumption while providing no improvement to system accuracy.

Next, during determining 340, subsets 342 of anomalous data may be identified in one or more of the data sets in the plurality of data sets 102. The determining 340 may be comprise using an anomaly detection technique, such as implementing an anomaly detection model. The anomaly detection model may be a machine learning model trained to analyze attributes and identify patterns within sets of data. The anomalous data may refer to data that is unique and/or useful for model training and/or response generation. For example, data that is repetitive and/or irrelevant is not anomalous and need not be processed (since it will have no effect on the output and will waste computing resources). Therefore, any data not in the subsets 342 of anomalous data may be removed from their respective data sets during removing 350, leaving only heterogeneous, relevant data for processing. In alternative aspects, anomalous data may be removed while non-anomalous data may be retained in the respective data sets.

Lastly, during resizing 360, data in one or more data sets of the plurality of data sets 102 may be resized, such as according to the particular data type. For example, compression techniques may be used on visual media files (e.g., pictures, videos, and/or the like) to reduce their size. Compression techniques, such as quantization, typically refer to a process of reducing the amount of data (and therefore the size) needed to represent the content of image and video data sets, but without losing overall quality, by eliminating "noise" caused by redundant and/or imperceptible elements of the file (certain pixel similarities, background patterns, etc.). The size of the data sets may be significantly reduced (e.g., by up to 80% according to some experimental results) but with little to no effect on accuracy (e.g., within 5% to 10% of the original data set).

The resulting plurality of altered data sets 112 may then be passed to a machine learning model (e.g., model 120 of FIG. 1 or model 220 of FIG. 2) for training and/or output generation as described above. Since the plurality of altered data sets 112 has less data sets and/or smaller data sets than the original plurality of data sets 102, energy and computing resources are conserved (i.e., resource consumption is decreased compared to using the original data sets). In some embodiments, further action may be taken, such as storing the altered plurality of data sets for future use. In other embodiments, the plurality of data sets may be iteratively altered when new data sets are received (e.g., by performing one or more of the aforementioned steps), so that the altered plurality of data sets is continuously updated and computing resource utilization remains optimized.

In some embodiments, the steps described above may be performed in a different order and/or only a subset of the steps may be performed (e.g., instead of performing discarding 330, removing 350, and resizing 360, may be performed) depending on the amount of the data sets received, the types of data sets received, and/or the particular energy consumption requirements (or energy saving goals) of the particular system.

Figure 4:
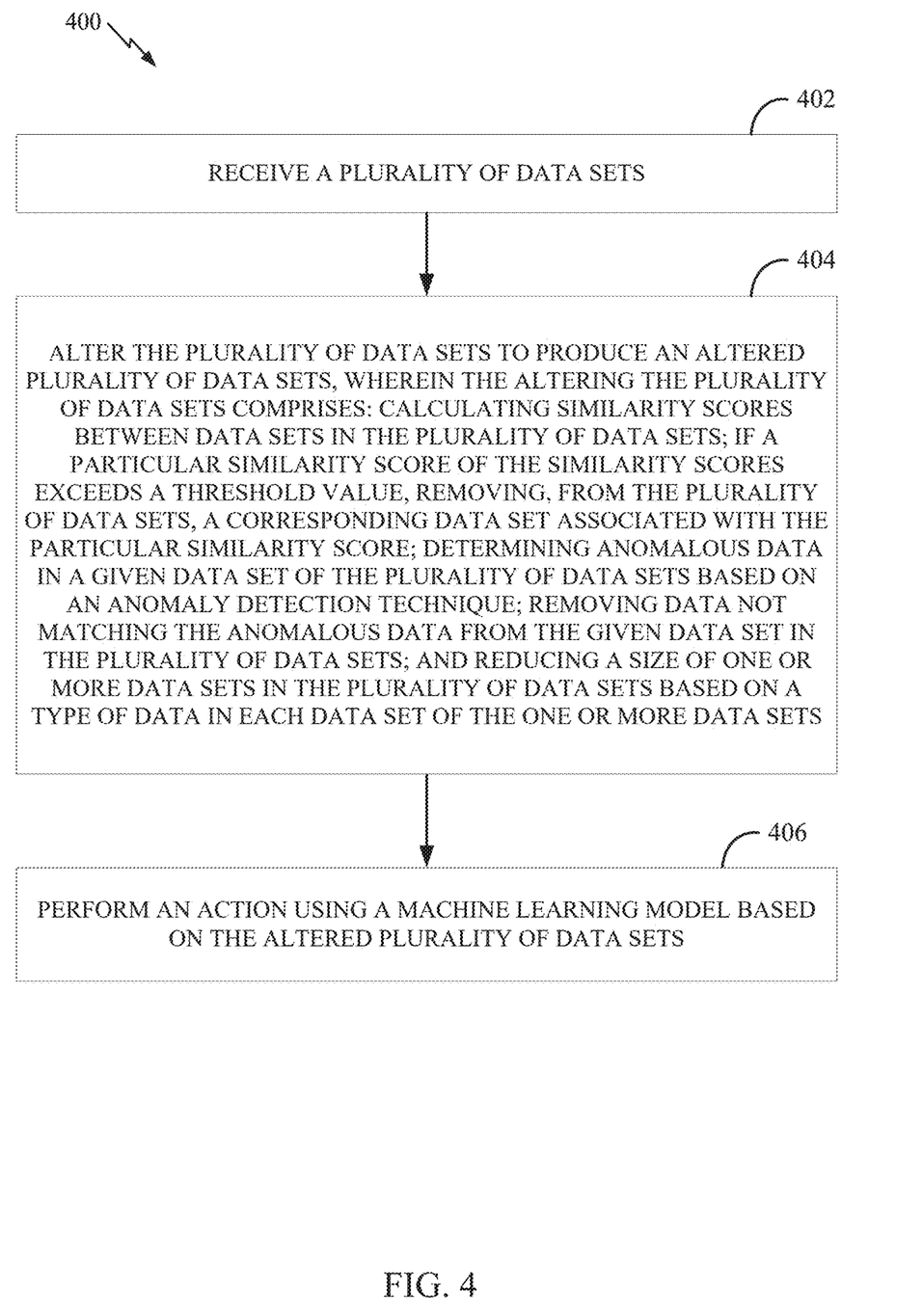
FIG. 4 depicts example operations related to optimizing resource utilization in machine learning models.

Example Operations Related to Optimizing Resource Utilization in Machine Learning Models FIG. 4 depicts example operations 400 related to optimizing resource utilization in machine learning models. For example, operations 400 may be performed by one or more of the components described with respect to FIG. 1, FIG. 2, and/or FIG. 3.

Operations 400 begin at step 402 with receiving a plurality of data sets.

Operations 400 continue at step 404 with altering the plurality of data sets to produce an altered plurality of data sets, wherein the altering the plurality of data sets comprises: calculating similarity scores between data sets in the plurality of data sets; if a particular similarity score of the similarity scores exceeds a threshold value, removing, from the plurality of data sets, a corresponding data set associated with the particular similarity score; determining anomalous data in a given data set of the plurality of data sets based on an anomaly detection technique; removing data not matching the anomalous data from the given data set in the plurality of data sets; and reducing a size of one or more data sets in the plurality of data sets based on a type of data in each data set of the one or more data sets. In some embodiments, the calculating the similarity scores between the data sets in the plurality of data sets is performed using a similarity metric based on a type of data in the data sets, wherein the similarity metric comprises one or more of: a cosine similarity technique; a Euclidean distance; or a Jaccard index. According to certain embodiments, the threshold value is determined based on one or more features in the data sets and weights assigned to the one or more features in the machine learning model. Some embodiments provide that, the anomaly detection technique involves using an anomaly detection model trained to analyze attributes and identify patterns within sets of data. In certain embodiments, the reducing the size of the one or more data sets in the plurality of data sets based on the type of data in each data set of the one or more data sets comprises compressing visual media data in the one or more data sets.

Operations 400 continue at step 406 with performing an action using a machine learning model based on the altered plurality of data sets. According to some embodiments, the performing the action using the machine learning model based on the altered plurality of data sets comprises one or more of: training the machine learning model based on the altered plurality of data sets, comprising providing as training inputs, to the machine learning model, the altered plurality of data sets and iteratively adjusting parameters of the machine learning model based on training outputs generated by the machine learning model in response to the training inputs; or generating an output using the machine learning model based on the altered plurality of data sets.

Certain embodiments provide that the method further comprises one or more of: iteratively altering the plurality of data sets in response to receiving new data sets; storing the altered plurality of data sets; displaying the output via a user interface; or sending the output to one or more elements of a software application.

Figure 5:
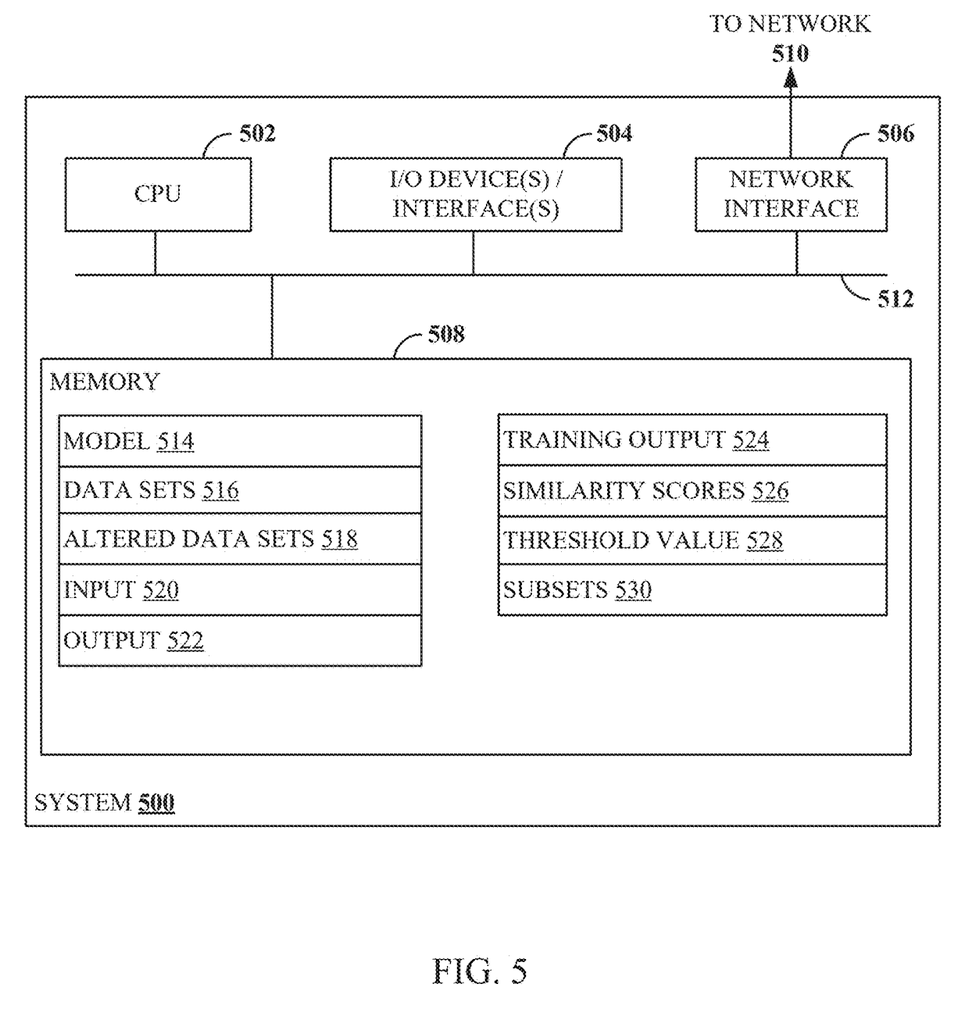
FIG. 5 depicts an example of a processing system for optimizing resource utilization in machine learning models.

Example of a Processing System for Optimizing Resource Utilization in Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, data sets 516, altered data sets 518, input 520, and output 522. Model 514 may be representative of model 120 of FIG. 1 and model 220 of FIG. 2. Data sets 516 may be representative of data sets 102 of FIG. 1 and FIG. 2. Altered data sets 518 may be representative of altered data sets 112 of FIG. 1 and FIG. 2. Input 520 may be representative of input 114 of FIG. 1. Output 522 may be representative of output 122 of FIG. 1.

Memory 508 further comprises training output 524 which may correspond to training output 222 of FIG. 2. Memory 508 further comprises similarity scores 526, which may correspond to similarity scores 312 of FIG. 3. Memory 508 further comprises threshold value 528, which may correspond to threshold value 314 of FIG. 3. Memory 508 further comprises subsets 530, which may correspond to subsets 342 of FIG. 3. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for optimizing resource utilization in machine learning models, comprising:
   receiving a plurality of data sets;
   altering the plurality of data sets to produce an altered plurality of data sets, wherein the altering the plurality of data sets comprises:
      calculating similarity scores between data sets in the plurality of data sets;
      if a particular similarity score of the similarity scores exceeds a threshold value, removing, from the plurality of data sets, a corresponding data set associated with the particular similarity score, wherein the threshold value is determined based on one or more features in the data sets and weights assigned to the one or more features in a machine learning model;
      determining anomalous data in a given data set of the plurality of data sets based on an anomaly detection technique;
      removing data not matching the anomalous data from the given data set in the plurality of data sets; and
      reducing a size of one or more data sets in the plurality of data sets based on a type of data in each data set of the one or more data sets; and
   performing an action using the machine learning model based on the altered plurality of data sets.

2. The method of claim 1, wherein the calculating the similarity scores between the data sets in the plurality of data sets is performed using a similarity metric based on a type of data in the data sets, wherein the similarity metric comprises one or more of:
   a cosine similarity technique;
   a Euclidean distance; or
   a Jaccard index.

3. The method of claim 1, wherein the anomaly detection technique involves using an anomaly detection model trained to analyze attributes and identify patterns within sets of data.

4. The method of claim 1, wherein the reducing the size of the one or more data sets in the plurality of data sets based on the type of data in each data set of the one or more data sets comprises compressing visual media data in the one or more data sets.

5. The method of claim 1, wherein the performing the action using the machine learning model based on the altered plurality of data sets comprises one or more of:
   training the machine learning model based on the altered plurality of data sets, comprising providing as training inputs, to the machine learning model, the altered plurality of data sets and iteratively adjusting parameters of the machine learning model based on training outputs generated by the machine learning model in response to the training inputs; or
   generating an output using the machine learning model based on the altered plurality of data sets.

6. The method of claim 1, further comprising one or more of:
   iteratively altering the plurality of data sets in response to receiving new data sets;
   storing the altered plurality of data sets;
   displaying the output via a user interface; or
   sending the output to one or more elements of a software application.

7. A system for optimizing resource utilization in machine learning models, comprising:
   one or more processors; and
   a memory comprising instructions that, when executed by the one or more processors, cause the system to:
      receive a plurality of data sets;
      alter the plurality of data sets to produce an altered plurality of data sets, wherein the altering the plurality of data sets comprises:
         calculating similarity scores between data sets in the plurality of data sets;
         if a particular similarity score of the similarity scores exceeds a threshold value, removing, from the plurality of data sets, a corresponding data set associated with the particular similarity score, wherein the threshold value is determined based on one or more features in the data sets and weights assigned to the one or more features in a machine learning model;
         determining anomalous data in a given data set of the plurality of data sets based on an anomaly detection technique;

removing data not matching the anomalous data from the given data set in the plurality of data sets; and reducing a size of one or more data sets in the plurality of data sets based on a type of data in each data set of the one or more data sets; and perform an action using the machine learning model based on the altered plurality of data sets.

8. The system of claim 7, wherein the calculating the similarity scores between the data sets in the plurality of data sets is performed using a similarity metric based on a type of data in the data sets, wherein the similarity metric comprises one or more of:

a cosine similarity technique;

a Euclidean distance; or a Jaccard index.

9. The system of claim 7, wherein the anomaly detection technique involves using an anomaly detection model trained to analyze attributes and identify patterns within sets of data.

10. The system of claim 7, wherein the reducing the size of the one or more data sets in the plurality of data sets based on the type of data in each data set of the one or more data sets comprises compressing visual media data in the one or more data sets.

11. The system of claim 7, wherein the performing the action using the machine learning model based on the altered plurality of data sets comprises one or more of:

training the machine learning model based on the altered plurality of data sets, comprising providing as training inputs, to the machine learning model, the altered plurality of data sets and iteratively adjusting parameters of the machine learning model based on training outputs generated by the machine learning model in response to the training inputs; or generating an output using the machine learning model based on the altered plurality of data sets.

12. The system of claim 7, wherein the instructions, when executed by the one or more processors, further cause the system to:

iteratively alter the plurality of data sets in response to receiving new data sets;

store the altered plurality of data sets;

display the output via a user interface; or send the output to one or more elements of a software application.

13. A non-transitory computer readable medium comprising instructions that, when executed by one or more processors of a computing system, cause the computing system to:

receive a plurality of data sets;

alter the plurality of data sets to produce an altered plurality of data sets, wherein the altering the plurality of data sets comprises:

calculating similarity scores between data sets in the plurality of data sets;

if a particular similarity score of the similarity scores exceeds a threshold value, removing, from the plurality of data sets, a corresponding data set associated with the particular similarity score, wherein the threshold value is determined based on one or more features in the data sets and weights assigned to the one or more features in a machine learning model;

determining anomalous data in a given data set of the plurality of data sets based on an anomaly detection technique;

removing data not matching the anomalous data from the given data set in the plurality of data sets; and reducing a size of one or more data sets in the plurality of data sets based on a type of data in each data set of the one or more data sets; and perform an action using the machine learning model based on the altered plurality of data sets.

14. The non-transitory computer readable medium of claim 13, wherein the calculating the similarity scores between the data sets in the plurality of data sets is performed using a similarity metric based on a type of data in the data sets, wherein the similarity metric comprises one or more of:

a cosine similarity technique;

a Euclidean distance; or a Jaccard index.

15. The non-transitory computer readable medium of claim 13, wherein the anomaly detection technique involves using an anomaly detection model trained to analyze attributes and identify patterns within sets of data.

16. The non-transitory computer readable medium of claim 13, wherein the reducing the size of the one or more data sets in the plurality of data sets based on the type of data in each data set of the one or more data sets comprises compressing visual media data in the one or more data sets.

17. The non-transitory computer readable medium of claim 13, wherein the performing the action using the machine learning model based on the altered plurality of data sets comprises one or more of:

training the machine learning model based on the altered plurality of data sets, comprising providing as training inputs, to the machine learning model, the altered plurality of data sets and iteratively adjusting parameters of the machine learning model based on training outputs generated by the machine learning model in response to the training inputs; or generating an output using the machine learning model based on the altered plurality of data sets.

* * * * *